United States Patent [19]
Hibino

[11] Patent Number: 5,485,155
[45] Date of Patent: Jan. 16, 1996

[54] RADAR SYSTEM DETECTING PLURAL OBSTACLES AND MEASURING DISTANCE BASED ON FULL GAIN AND AUTOMATIC GAIN CONTROL

[75] Inventor: Katsuhiko Hibino, Toyoake, Japan

[73] Assignee: Nippondenso Co., Ltd., Toyota, Japan

[21] Appl. No.: 346,297

[22] Filed: Nov. 23, 1994

[30] Foreign Application Priority Data

Nov. 25, 1993 [JP] Japan ................. 5-295340

[51] Int. Cl.$^6$ ................................. G01S 13/93
[52] U.S. Cl. ........................................ 342/70
[58] Field of Search ................. 342/70, 71, 72, 342/29, 92; 180/167, 168, 169

[56] References Cited

U.S. PATENT DOCUMENTS

| | | | |
|---|---|---|---|
| 3,749,197 | 7/1973 | Deutsch | 342/71 |
| 3,772,690 | 11/1973 | Nations | 342/70 |
| 3,934,252 | 1/1976 | Ross et al. | 342/70 |
| 4,039,782 | 8/1977 | Burckhardt et al. | 342/71 |
| 4,551,722 | 11/1985 | Tsuda et al. | 342/70 |
| 4,552,456 | 11/1985 | Endo | 342/70 |
| 4,641,136 | 2/1987 | Kowalczyk | 342/71 |
| 4,757,450 | 7/1988 | Etoh | 342/70 |
| 4,926,171 | 5/1990 | Kelley | 342/29 |
| 5,260,710 | 11/1993 | Omamyuda et al. | 342/70 |

FOREIGN PATENT DOCUMENTS

59-99376  6/1984  Japan.

*Primary Examiner*—Charles T. Jordan
*Assistant Examiner*—Theresa M. Wesson
*Attorney, Agent, or Firm*—Cushman Darby & Cushman

[57] ABSTRACT

First, a variable gain amplifier amplifies an output of a light-receiving element with the gain fixed at the maximum value and a laser diode is repeatedly actuated. Distance data obtained in each measurement is stored in a RAM. Second, the measurement is executed by varying the gain of the variable gain amplifier based on automatic gain control AGC technology. Meanwhile, a full gain distance calculation and a full gain relative speed calculation are carried out based on the distance data stored during the first step. Furthermore, in a third step, an AGC distance calculation and an AGC relative speed calculation are carried out based on the distance data stored during the second step. The full-gain based detection and the AGC based detection are alternately repeated, thereby accurately and reliably detecting a plurality of obstacles in a radar detection area.

20 Claims, 11 Drawing Sheets

RADAR SYSTEM DETECTING PLURAL OBSTACLES AND MEASURING DISTANCE BASED ON FULL GAIN AND AUTOMATIC GAIN CONTROL

BACKGROUND OF THE INVENTION

1. Field of the Invention

The present invention relates to a radar system using beamed and reflected radio-frequency energy for detecting objects, measuring distance or altitude, and other purposes, based on detection of the time interval between transmission of the energy (electromagnetic wave) to an object in the beam's path and reception of the energy reflected from the object.

2. Prior Art

A typical conventional radar system comprises an electromagnetic wave transmission means for intermittently emitting electromagnetic waves of pulse waveform, electromagnetic wave reception means for receiving the electromagnetic wave reflected from an object and a distance calculating means for calculating the distance of the object from the radar system on the basis of the time interval between the transmission of the electromagnetic wave and the reception of the same electromagnetic wave reflected from the object. The method of calculating the distance in this kind of radar system is as follows.

Figure 11A:
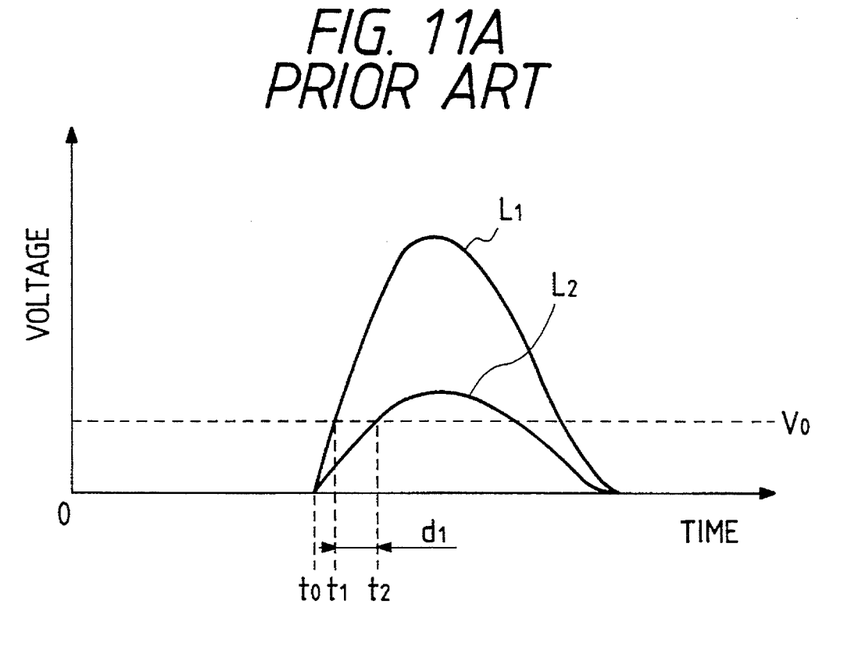
FIGS. 11A and 11B are time charts showing the output voltage of a conventional radar system.

As shown in FIG. 11A, an electromagnetic wave received by the electromagnetic reception means is converted into a voltage corresponding to its intensity. A time interval between the emission of the electromagnetic wave and the moment of the voltage reaches a reference voltage $V0$ is then detected. The detected time interval is multiplied with a half of light speed to calculate the distance of the object from the radar system. However, the electromagnetic wave emitted from the electromagnetic wave transmission means has a gradual pulse waveform having round corners at pulse edges. Therefore, its corresponding voltage curve is a mountain-like waveform as shown by a curve $L1$ or $L2$ in FIG. 11A. For this reason, there is a significant amount of time lag (delay) between the reception of the electromagnetic wave by the electromagnetic wave reception means (i.e. time $t0$) and the moment the voltage reaches a reference voltage $V0$ (i.e. time $t1$ or $t2$). Furthermore, the length of this time lag varies depending on the intensity of the electromagnetic wave received. More specifically, in the example of FIG. 11A, the curve $L1$ representing a strong electromagnetic wave causes a time lag $t1$ to reach the reference voltage $V0$ while the curve $L2$ representing a weak electromagnetic wave causes a time lag $t2$ to reach the same voltage. The time difference $d1$ between times $t1$ and $t2$ directly results in a measuring error of the radar system.

Figure 11B:
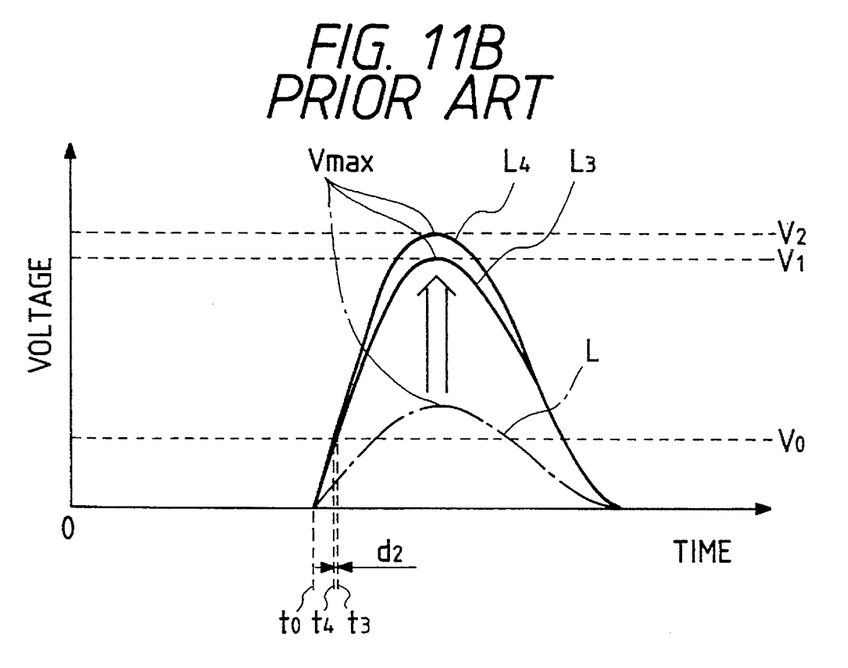
Figure 12:
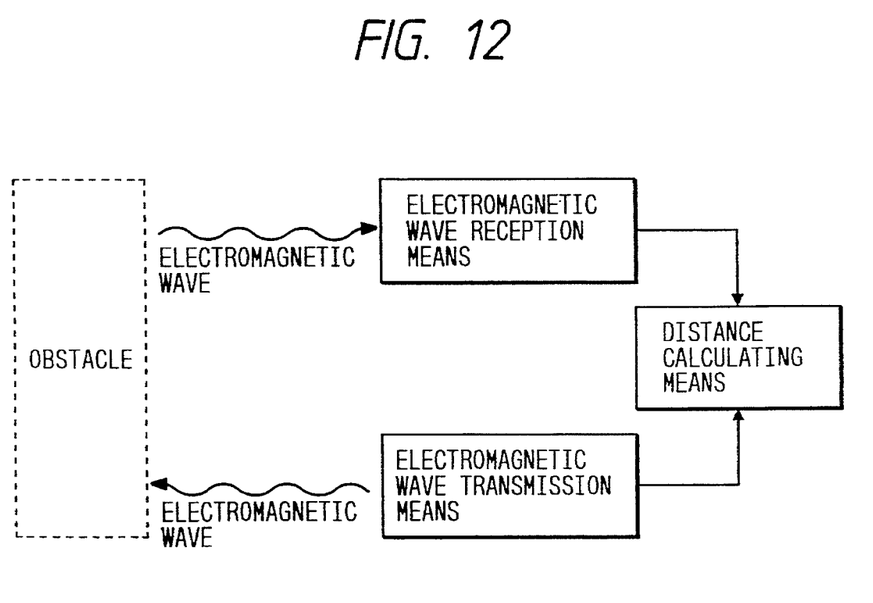
FIG. 12 is a schematic view illustrating the arrangement of the present invention.

An effective way of preventing such a measuring error is believed to amplify the voltage curve L so that its maximum value $Vmax$ exists somewhere in a predetermined higher range from $V1$ to $V2$ as shown in FIG. 11B. With this amplification, voltage curves $L3$ and $L4$ are newly obtained. The curve $L3$ causes a time lag $t3$ to reach the reference voltage $V0$ while the curve $L4$ causes a time lag $t4$ to reach the same voltage. The time difference $d2$ between times $t3$ and $t4$ is very small. Therefore, it becomes possible to improve the measuring accuracy when the distance of an object is calculated on the basis of these times $t3$ and $t4$. This is a so-called AGC (Automatic Gain Control) method.

However, when two objects to be detected simultaneously exist in the same detection area of the radar system, an AGC based radar system still has a possibility of encountering difficulty in accurately detecting both of these objects. For example, if one of the two objects is an object having a large reflectance and the other is an object having a small reflectance, there is a large possibility that the latter object will not be detected. This is a case where large and small peaks appear on the voltage curves obtained from the received electromagnetic wave respective voltage curves being largely differentiated in proportion to widely different reflectances of two objects. The AGC operation is carried out in such a manner that the amplified maximum value $Vmax$ of the large peak exists in the predetermined higher range from $V1$ to $V2$. If the ratio of large peak height to small peak height is larger than $V2 : V0$, the small peak will not be able to exceed the reference voltage $V0$ under such an AGC operation. Namely, the presence of the small peak cannot be detected. This is why there is possibility of failing to detect an object having a small reflectance when another object having a large reflectance exists simultaneously in the same detection area of the radar system.

Similar problem will arise when one of two objects is located directly in front of the radar equipment even if two objects have the same reflectance because, an electromagnetic wave reflected from the object located directly ahead of the radar equipment is stronger than an electromagnetic wave reflected from the other object. Thus, the radar equipment may fail to detect the object offset from the center line the radar beam.

SUMMARY OF THE INVENTION

Accordingly, in view of above-described problems encountered in the prior art, a principal object of the present invention is to provide a radar system capable of reliably detecting each object even if a plurality of objects simultaneously exist in the same detection area.

In order to accomplish this and other related objects, a first aspect of the present invention provides a radar system comprising: electromagnetic wave transmission means for emitting electromagnetic waves of pulse waveform intermittently; electromagnetic wave reception means for receiving the electromagnetic wave reflected from an obstacle; the distance calculating means for calculating distance of the obstacle from the radar system on the basis of a time interval between the transmission of the electromagnetic wave from the electromagnetic wave transmission means and the reception of the same electromagnetic wave by the electromagnetic wave reception means; first reception control means for controlling a gain of the electromagnetic wave reception means to have a standard sensitivity corresponding to a maximum value of the electromagnetic wave received by the electromagnetic wave reception means; and second reception control means for controlling the gain of the electromagnetic wave reception means to have its maximum sensitivity, wherein the time interval is calculated based on electromagnetic wave detected by the electromagnetic wave reception means having the standard sensitivity and the electromagnetic wave detected by the electromagnetic wave reception means having the maximum sensitivity.

In a preferable mode, the first reception control means controls the gain of the electromagnetic wave reception means using automatic gain control method. The first reception control means and the second reception control means alternately measures the distance of the obstacle. Furthermore, the first aspect radar system may include comparing means which compares a first distance of the obstacle measured based on the standard sensitivity and a second distance of the obstacle measured based on the maximum sensitivity to determine a true distance. The first distance obtained based on the standard sensitivity is adopted as the true distance when a difference between the first and second two distances is not larger than a predetermined value, while the second distance obtained based on the maximum sensitivity is adopted as the true distance when the difference between the first and ;second distances is larger than the predetermined value. Moreover, the radar system may include an anti-collision control means which generates an alarm when the true distance is shorter than a predetermined safe distance. Still further, the radar system may include a measuring period varying means for varying a period of emitting the electromagnetic wave from the electromagnetic wave transmission means so that one complete measuring cycle is varied in response to the accuracy required. The accuracy is judged based on the distance of the obstacle obtained.

A second aspect of the present invention provides a radar system for measuring distance of an obstacle, comprising: a semiconductor laser diode emitting a semiconductor laser beam of pulse waveform; a light receiving element receiving the semiconductor laser beam reflected from the obstacle and generating a voltage signal corresponding to the intensity of the semiconductor laser beam received; a drive circuit actuating the semiconductor laser diode; a control circuit connected to the drive circuit for supplying the drive circuit with a drive signal to emit the semiconductor laser beam from the semiconductor laser diode; a variable gain amplifier receiving the voltage signal generated from the light receiving element and amplifying the voltage signal in response to a gain given by the control circuit; a comparator comparing an output of the variable gain amplifier with a reference value and generating a light receiving signal when the output of the variable gain amplifier exceeds the reference value; a time interval measuring circuit receiving both the drive signal and the light receiving signal to measure a time interval between transmission of the drive signal and reception of the light receiving signal and sending the time interval as a distance data to the control circuit; and the control circuit that calculates the distance of the obstacle from the radar system on the basis of the distance data, wherein the control circuit controls a gain of the variable gain amplifier to have a standard sensitivity corresponding to a maximum value of the semiconductor laser beam received by the light receiving element during a first measuring period, and controls the gain of the variable gain amplifier to have its maximum sensitivity during a second measuring period.

In a preferable mode, the output of the variable gain amplifier is input to a window comparator which compares the output of the variable gain amplifier with each of two predetermined window values. The comparison result of the window comparator is sent to the control circuit to execute the automatic gain control of the variable gain controller. The control circuit is connected to a warning device generating an alarm when the distance of the obstacle is shorter than a predetermined safe distance.

A third aspect of the present invention provides an obstacle detecting method for a radar system comprising beamed energy transmission means for emitting a beam and beamed energy reception means for receiving the beam reflected from an obstacle, comprising: a first controlling step of controlling a gain of the beamed energy reception means to have its maximum sensitivity; a first calculating step of calculating distance of the obstacle from the radar system on the basis of a time interval between transmission of the beam from the beamed energy transmission means and reception of a reflected beam by the beamed energy reception means having the maximum sensitivity; a second controlling step of controlling the gain of the beamed energy reception means to have a standard sensitivity corresponding to a maximum value of the beam received by the beamed energy reception means; and a second calculating step of calculating distance of the obstacle from the radar system on the basis of a time interval between transmission of the beam from the beamed energy transmission means and reception of a reflected beam by the beamed energy reception means having the standard sensitivity.

It is preferable that one complete measuring cycle is divided into at least first, second and third sequential sections, wherein the first controlling step is executed in the first section, the first calculating step and the second controlling step are executed in the second section, and the second calculating step is executed in the third section. The present method may include a comparing step of comparing the two distances of the obstacle obtained from the first and second calculating steps in order to determine a true distance. The distance obtained in the first calculating step is adopted as the true distance when a difference between the two distances is larger than a predetermined value, while the distance obtained in the second calculating step is adopted as the true distance when the difference between the two distances is not larger than the predetermined value. The present method may include an anti-collision processing executed based on the true distance, the anti-collision processing generating an alarm when the true distance is shorter than a predetermined safe distance. The present method may further include a measuring period varying step of varying a period of the one complete measuring cycle in response to accuracy required. The accuracy is judged based on the distances of the obstacle obtained in the first and second calculating steps. Yet further, it is preferable that the second controlling step is carried out by an automatic gain control which flexibly adjusts the gain of the beamed energy reception means in such a manner that the maximum value of the beam received by the beamed energy reception means is in a predetermined range.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENT

Figure 1:
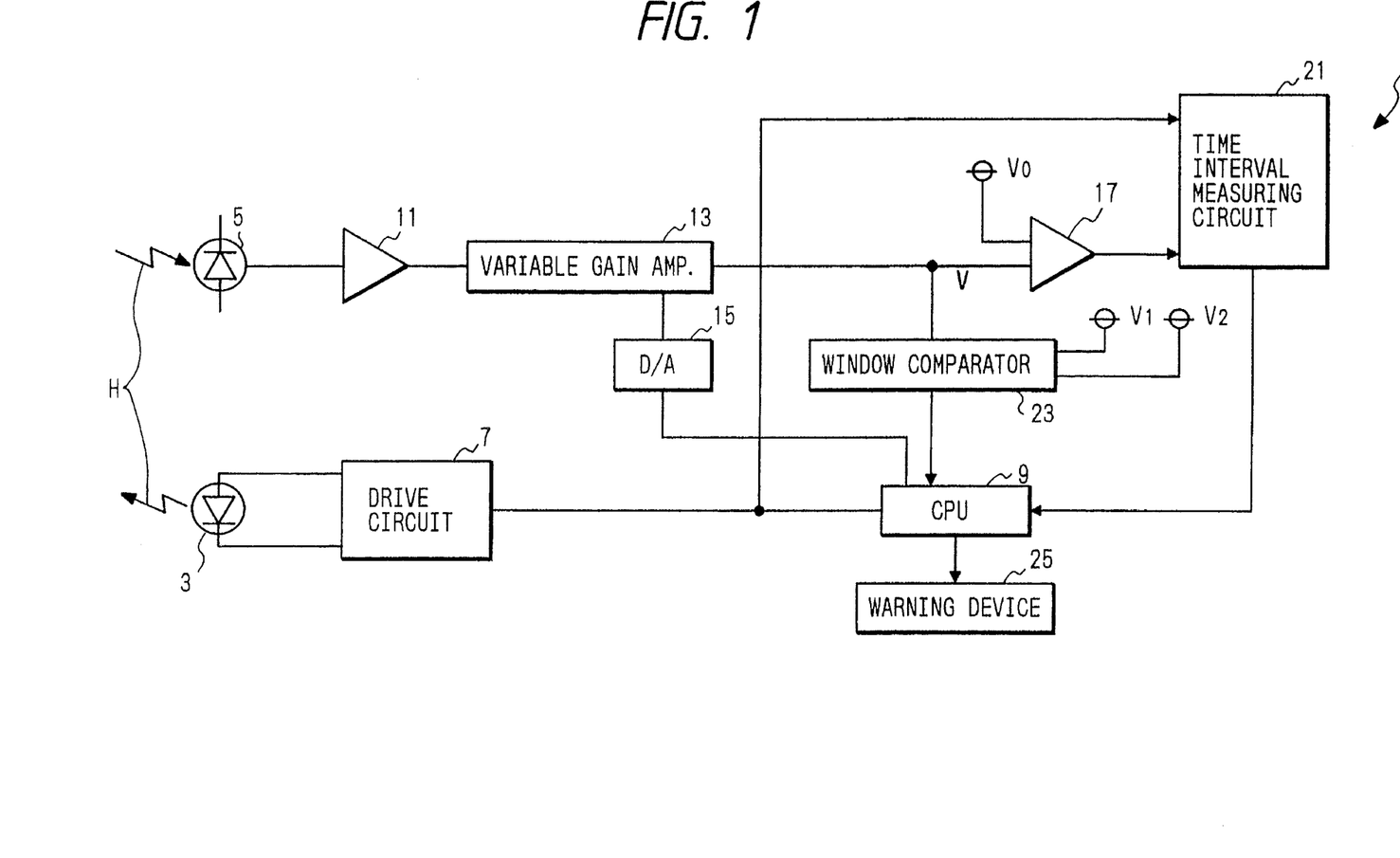
FIG. 1 is a schematic diagram showing a radar system in accordance with a first embodiment of the present invention.

A first embodiment of the radar system in accordance with the present invention will be explained in greater detail hereinafter, with reference to the accompanying drawings. FIG. 1 is a schematic diagram showing a radar system 1 in accordance with the first embodiment, which is installed in an automatic vehicle to detect an object (obstacle) existing in of the direction the automatic vehicle.

As shown in FIG. 1, the radar system 1 comprises a semiconductor laser diode 3 acting as electromagnetic wave transmission means for emitting a semiconductor laser beam H having a pulse waveform, and a light receiving element 5 acting as electromagnetic wave reception means for receiving the semiconductor laser beam H reflected from the object (obstacle), which is not shown, and generating a voltage corresponding to the intensity of the semiconductor laser beam H received.

The laser diode 3, which is connected to an electronic control circuit (CPU) 9 via a drive circuit 7, emits the semiconductor laser beam H in response to a drive signal given from the electronic control circuit 9. Meanwhile, an output voltage of the light receiving element 5 is amplified to a predetermined level through a preamplifier 11 and thereafter supplied to a variable gain amplifier 13. The variable gain amplifier 13, connected to the electronic control circuit 9 via a D/A converter 15, amplifies its input voltage in response to a gain determined by the electronic control circuit 9 and sends the amplified output voltage V to a comparator 17. The comparator 17 compares the output voltage V of the variable gain amplifier 13 with a reference voltage V0, and sends a predetermined light receiving signal to a time interval measuring circuit 21 when the output voltage V exceeds the reference voltage V0.

In addition to the light receiving signal, the time interval measuring circuit 21 receives the drive signal given from the electronic control circuit 9 to the drive circuit 7. The time interval measuring circuit 21, which is a well-known type constituted by a plurality of integrated circuits (ICs), measures a time interval between transmission of the drive signal and reception of the light receiving signal, and sends the thus measured time interval as distance data to the electronic control circuit 9. On the basis of this distance data, the electronic control circuit 9 calculates the distance of the object (obstacle) measured from the radar system. That is, the time interval measuring circuit 21 and the electronic control circuit 9 cooperatively constitute distance calculating means.

Furthermore, the output voltage V of the variable gain amplifier 13 is input to a window comparator 23 which compares the output voltage V of the variable gain amplifier 13 with each of two predetermined higher voltages V1 and V2. The voltages V1 and V2 are fairly larger than the reference voltage V0 and voltage V2 is slightly larger than voltage V1. The comparison result of the window comparator 23 is sent to the electronic control circuit 9. Furthermore, the electronic control circuit 9 is connected to a warning device 25 that generates an alarm using light, sound and other warning indicators. Thus, the electronic control circuit 9 gives a warning to a driver of the vehicle having the radar system as soon as the system detects an obstacle in the forward direction of the vehicle.

Figure 2:
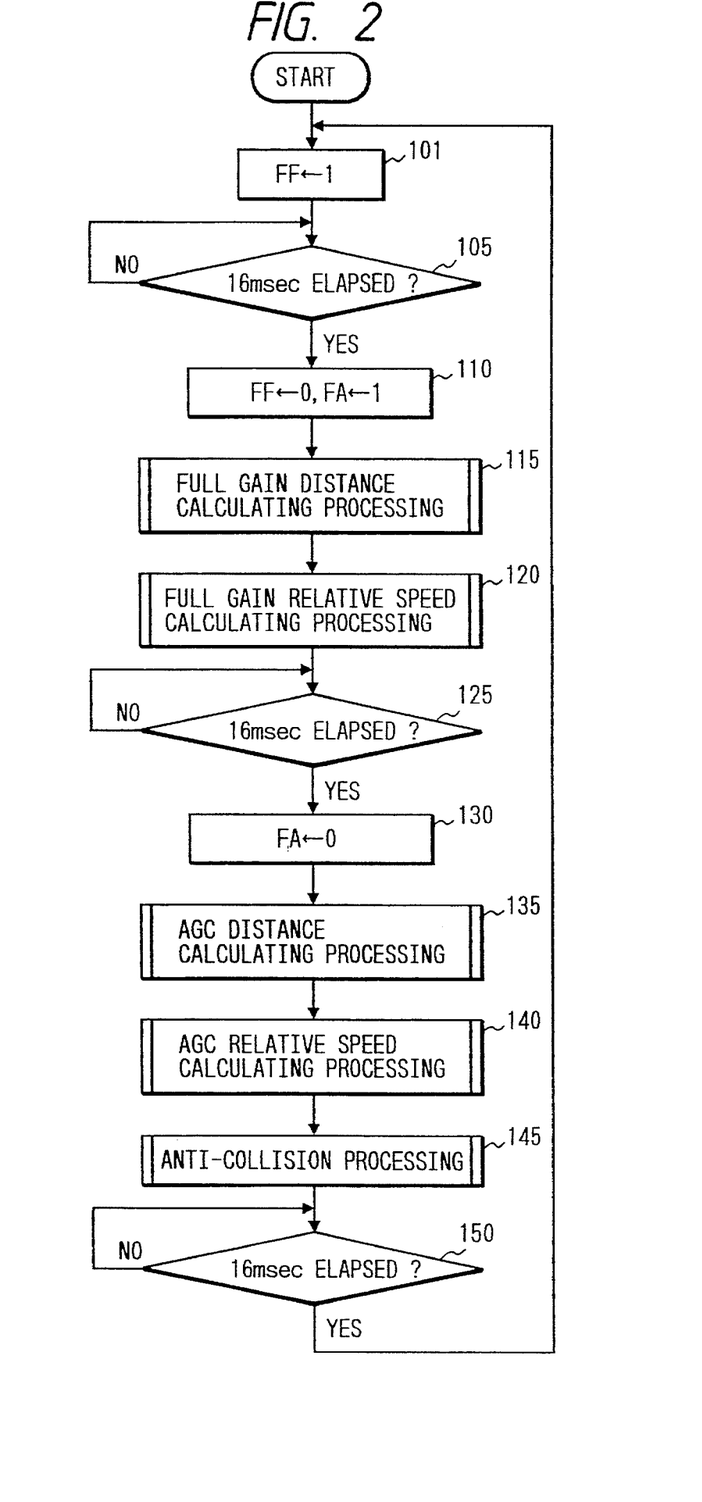
FIG. 2 is a flowchart showing a main routine in an obstacle detecting process in accordance with the first embodiment of the present invention.
Figure 3:
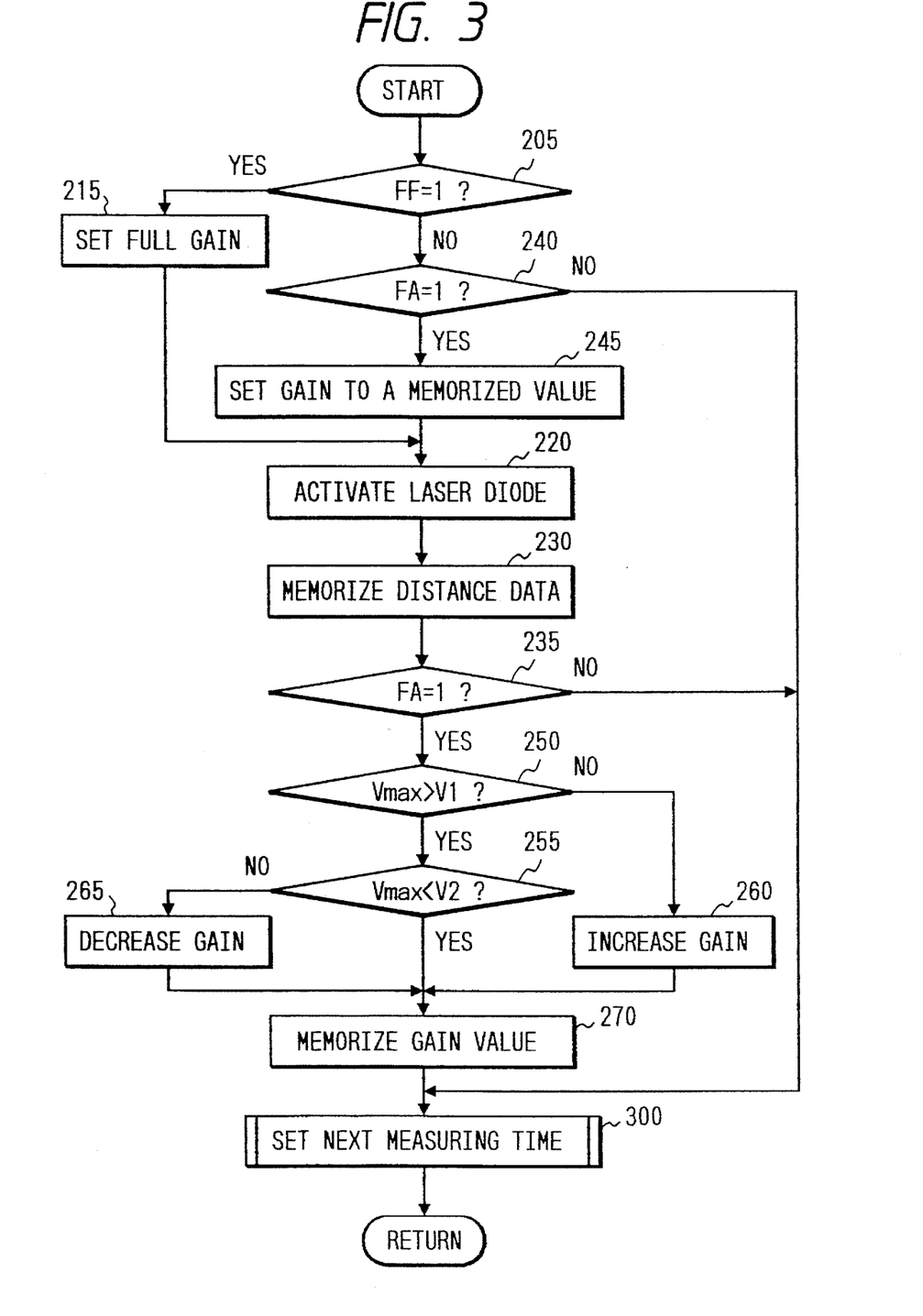
FIG. 3 is a flowchart showing an interrupt routine of the obstacle detecting process in accordance with the first embodiment of the present invention.
Figure 4:
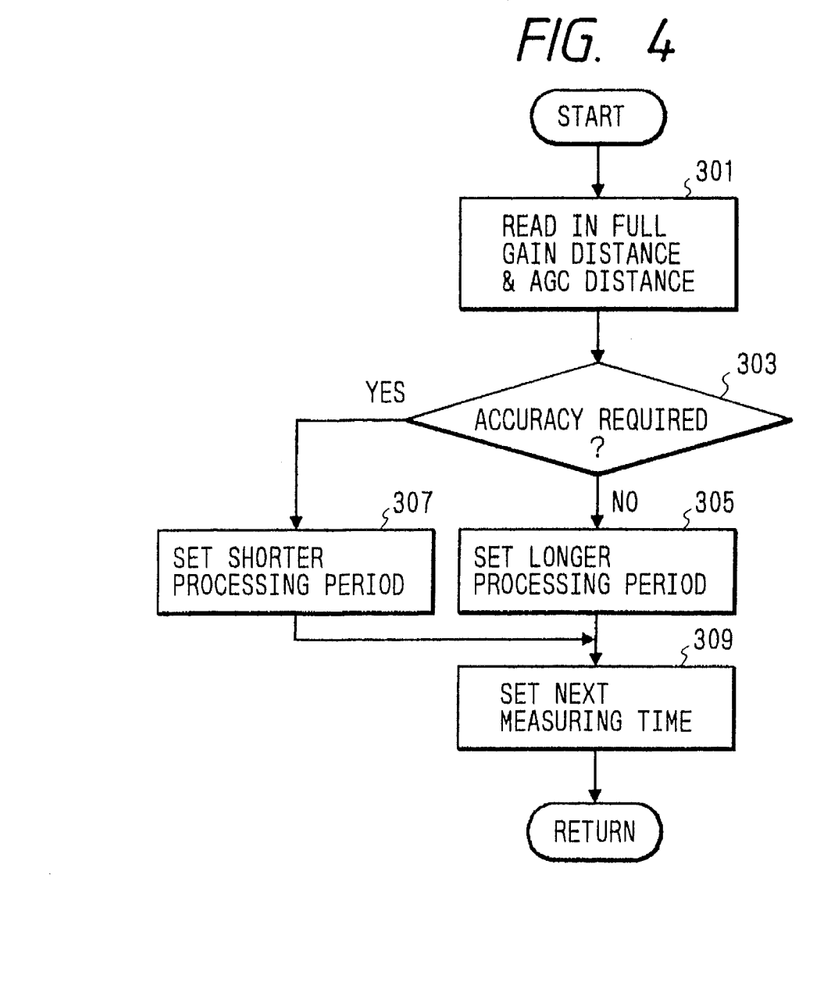
FIG. 4 is a flowchart showing a measuring time setting routine of the interrupt routine in accordance with the first embodiment of the present invention.

Next, an operation of the radar system 1 constituted as described above will be explained. FIG. 2 is a flowchart showing a main routine of an obstacle detecting process in accordance with a first embodiment of the present invention, executed by the electronic control circuit (CPU) 9 upon an electric power source beginning supplying electric power to the radar system 1. FIGS. 3 and 4 are flowcharts showing interrupt routines of the obstacle detecting process, which is periodically executed at predetermined intervals during execution of the main routine.

First of all, the CPU 9 sets a full gain flag FF to "1" in a step 101 as shown in FIG. 2. Then, the CPU 9 proceeds to a step 105 which sets a first waiting period equivalent to an elapse of 16 msec. The full gain flag FF is reset to "0" together with an AGC flag FA later described at the moment the electric power source starts supplying electric power to the radar system 1.

During this first 16 msec waiting period, the CPU 9 executes the interrupt routine of FIG. 3. First, in a step 205, a judgement is made as to whether or not the full gain flag FF is already set to "1". As the full gain flag FF is equal to "1" at this moment, the result of judgement in the step 205 is "YES" and, therefore, the CPU 9 proceeds to a step 215 to increase the gain of the variable gain amplifier 13 to the maximum value (i.e. full gain) and thereafter the CPU 9 proceeds to a step 220. It will be preferable that the variable gain amplifier 13 of the radar system 1 employed in the present embodiment has a full gain of approximately 1,000.

In the step 220, the CPU 9 supplies the drive circuit 7 with a drive signal to emit a laser beam from the laser diode 3. In the succeeding step 230, the CPU 9 receives a distance data supplied from the time interval measuring circuit 21 which is generated in response to the reception of the laser beam reflected from an obstacle. The CPU 9 has a RAM, not shown in the drawing, for memorizing this distance data. Subsequently, in a step 235, a judgement is made as to whether or not the AGC flag FA is set to "1". As the AGC flag FA is not "1" at this moment, the CPU 9 proceeds to a step 300. In the step 300, the CPU 9 determines a next measuring time for executing this interrupt routine next by using a measuring time setting routine later described. After that, the CPU 9 ends the present processing cycle and returns to the main routine of FIG. 2.

After the passage of first 16 msec period in the step 105, the CPU 9 proceeds to a step 110 to reset the full gain flag FF to "0" and set the AGC flag FA to "1". In the succeeding step 115, the CPU 9 takes an average of the distance data memorized in the step 230 of the previously explained interrupt routine and calculates a distance (i.e. a full gain distance) of an obstacle measured from the vehicle on the basis of the average obtained. Furthermore, in the succeeding step 120, a relative speed (i.e. a full gain relative speed)

is calculated on the basis of time differential of the distance data. After that, the CPU 9 proceeds to a step 125 which sets a second waiting period equivalent to an elapse of 16 msec in the same manner as the step 105.

During this second 16 msec waiting period, the interrupt routine of FIG. 3 is executed again. As the full gain flag FF is "0" at this moment, the result of the step 205 is "NO" Therefore, the CPU 9 proceeds to a step 240 to further make a judgement as to whether or not the AGC flag FA is already set to "1". As the AGC flag FA is equal to "1" at this moment, the CPU 9 proceeds to a step 245 to set the gain of the variable gain amplifier 13 to be a memorized value and subsequently proceeds to steps 220, 230 and 235. The memorized value in this case is a value memorized in a step 270 later described. However, a value used in a first execution of the step 245 is a predetermined value other than the memorized value in the step 270 because the step 270 is not yet executed widen the step 245 is first executed. Next, in the step 235, the CPU 9 makes a judgement as to whether or not the AGC flag FA is already set to "1". Since the AGC flag FA is "1" at this moment, the result of judgement is "YES" in the step 235. Thus, the CPU 9 proceeds to a succeeding step 250.

In the step 250, a judgement is made based on the output of the window comparator 23 as to whether or not the maximum value Vmax of the output voltage V of the variable gain amplifier 13 is larger than the predetermined voltage V1. If the result of judgement is "YES", the CPU 9 proceeds to a step 255 to further make a judgement as to whether or not the maximum value Vmax is smaller than the predetermined value V2. Thereafter, the CPU 9 proceeds to a step 270. When the maximum value Vmax is not larger than the predetermined voltage V1 ("NO" in the step 250), the CPU 9 proceeds to a step 260 to correct the gain of the variable gain amplifier 13 by increasing its value, and then proceeds to the step 270. On the other hand, when the maximum value Vmax is not smaller than the predetermined voltage V2 ("NO" in the step 255), the CPU 9 proceeds to a step 265 to correct the gain of the variable gain amplifier 13 by decreasing its value, and then proceeds to the step 270. In other words, when the maximum value Vmax is somewhere between the predetermined voltages V1 and V2 ("YES" in the steps 250 and 255), the CPU 9 proceeds to the step 270 without correcting the gain of the variable gain amplifier 13. In the step 270, the CPU 9 memorizes a present gain value in the RAM. In other words, these steps 250–270 realizes AGC (automatic gain control) so as to adjust the gain of the variable gain amplifier 13 to satisfy a relation V1< Vmax<V2. After that, the CPU 9 proceeds to a step 300.

Returning the main routine of FIG. 2, after the passage of second 16 msec period in the step 125, the CPU 9 proceeds to a step 130 to reset the AGC flag FA to "0". In the succeeding step 135, the CPU 9 takes an average of the distance data memorized in the step 230 of the previously explained interrupt routine and calculates a distance (i.e. a AGC distance) of the obstacle measured from the system vehicle on the basis of the average value obtained. Furthermore, in the succeeding step 140, an AGC relative speed is calculated on the basis of time differential of the distance data. After that, the CPU 9 proceeds to a step 145 which executes an anti-collision processing.

Figure 5:
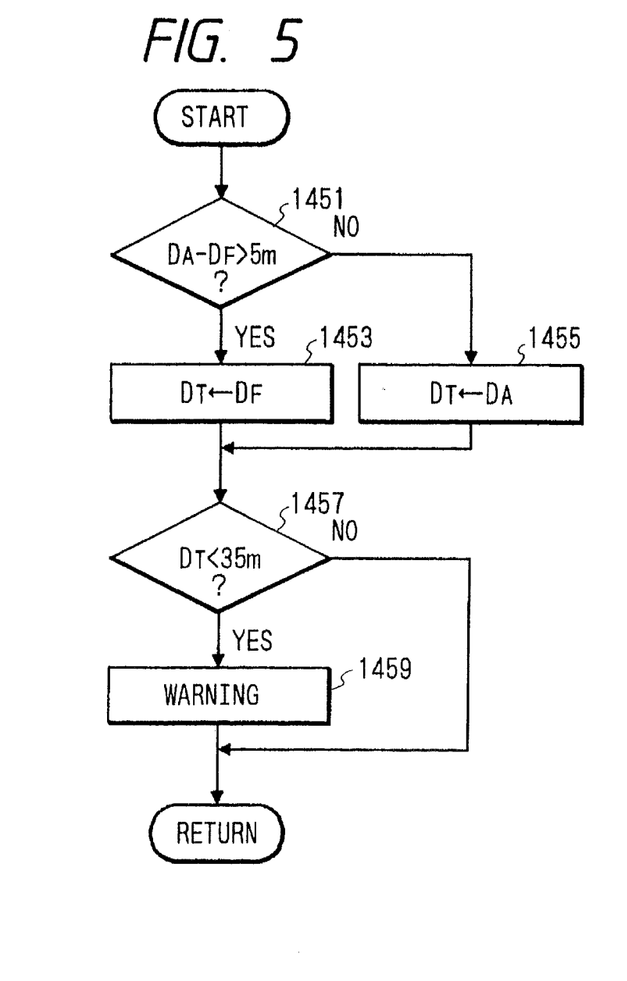
FIG. 5 is a flowchart showing an anti-collision process in accordance with the first embodiment of the present invention.

Next, an example of the anti-collision processing will be explained with reference to FIG. 5. The CPU 9 makes a judgement in a step 1451 as to whether or not a difference between the AGC distance $D_A$ and the full gain distance $D_F$ is larger than a predetermined distance (e.g. 5 m) with respect to the nearest obstacle. If the result of judgement in the step 1451 is "YES", the CPU 9 adopts the full gain distance $D_F$ as a true distance $D_T$ in a step 1453. On the contrary, if the result of judgement in the step 1451 is "NO", the CPU 9 adopts the AGC distance $D_A$ as the true distance $D_T$ in a step 1455. The reason why such a judgement is required is as follows. When compared with the AGC distance $D_A$, the full gain distance $D_F$ is not so accurate since the full gain distance $D_F$ includes a relatively large measuring error. Therefore, a priority is given to the AGC distance $D_A$ as far as detection failure is not found. To find the detection failure, this embodiment checks whether or not the difference between the AGC distance $D_A$ and the full gain distance $D_F$ is sufficiently small. More specifically, if the difference between the AGC distance $D_A$ and the full gain distance $D_F$ is not negligible, the CPU 9 judges that detection of an obstacle having a smaller reflectance has failed in the AGC distance calculating method because the AGC method has a large possibility of missing a small reflectance object when a large reflectance object exists in the same detection area as explained previously. Thus, the CPU 9 adopts the AGC distance $D_A$ as the true distance $D_T$ when the difference between the AGC distance $D_A$ and the full gain distance $D_F$ is small, while the full gain distance $D_F$ is adopted as the true distance $D_T$ only when the difference between the AGC distance $D_A$ and the full gain distance $D_F$ is larger than the predetermined value. Subsequently, the CPU 9 proceeds to a step 1457 to further make a judgement as to whether or not the true distance $D_T$ is smaller than a predetermined safe distance (e.g. 35 m). If the result of judgement is "YES" in the step 1457, the CPU 9 proceeds to a succeeding step 1459 to actuate the warning device 25 to generate alarm.

After finishing such an anti-collision processing in the step 145, the CPU 9 proceeds to a step 150 which sets a third waiting period equivalent to an elapse of 16 msec. Namely, a judgement is made as to whether or not a third 16 msec period has passed after entering the step 130. If this third 16 msec period has passed, the CPU returns to the first step 101. During this third 16 msec period, the interrupt routine of FIG. 3 is executed again. In this case, judgements in the steps 205 and 240 are both "NO"; therefore, the CPU 9 directly goes to the step 300 to set the next measuring time.

Details of the next measuring time setting routine of the step 300 will be explained with reference to FIG. 4. In the next measuring time setting routine, the CPU 9 reads in both the full gain distance and the AGC distance in a step 301. (A predetermined value will be used in the event any one of these distances has not yet been calculated.) In the next step 303, a judgement is made based on the full gain and AGC distances as to whether or not accuracy is required. For example, if the true distance $D_T$ is smaller than the predetermined safe distance (i.e. 35 m), the CPU 9 judges that accuracy is necessary. In this case, it is preferable that the safe distance is varied in accordance with the vehicle speed. If the result of judgement is "NO" in the step 303, the CPU 9 proceeds to a step 305 to set a processing period of the FIG. 3 interrupt routine longer (e.g. 48 cycles during a 16 msec period). On the other hand, if the result of judgement is "YES" in the step 303, the CPU 9 proceeds to a step 307 to set the processing period of the FIG. 3 interrupt routine shorter (e.g. 60 cycles during a 16 msec period). Then, the CPU 9 proceeds to a step 309 to set the next measuring time and thereafter ends this routine.

When the processing period of the interrupt routine is shortened to increase the accuracy of the detection, the total number of distance data stored in the step 230 during the waiting periods of 105 and 125 increases. This assures that the calculations in the steps 115, 120, 135 and 140 obtain accurate results on the basis of numerous distance data. On the other hand, when the processing period of the interrupt routine is enlarged, a total number of light emission in the laser diode 3 can be significantly decreased, thereby increasing durability of the laser diode 3.

The obstacle detecting process of the present embodiment will be next explained with reference to the time chart of FIG. 6, although FIG. 6 omits the anti-collision processing.

Figure 6:
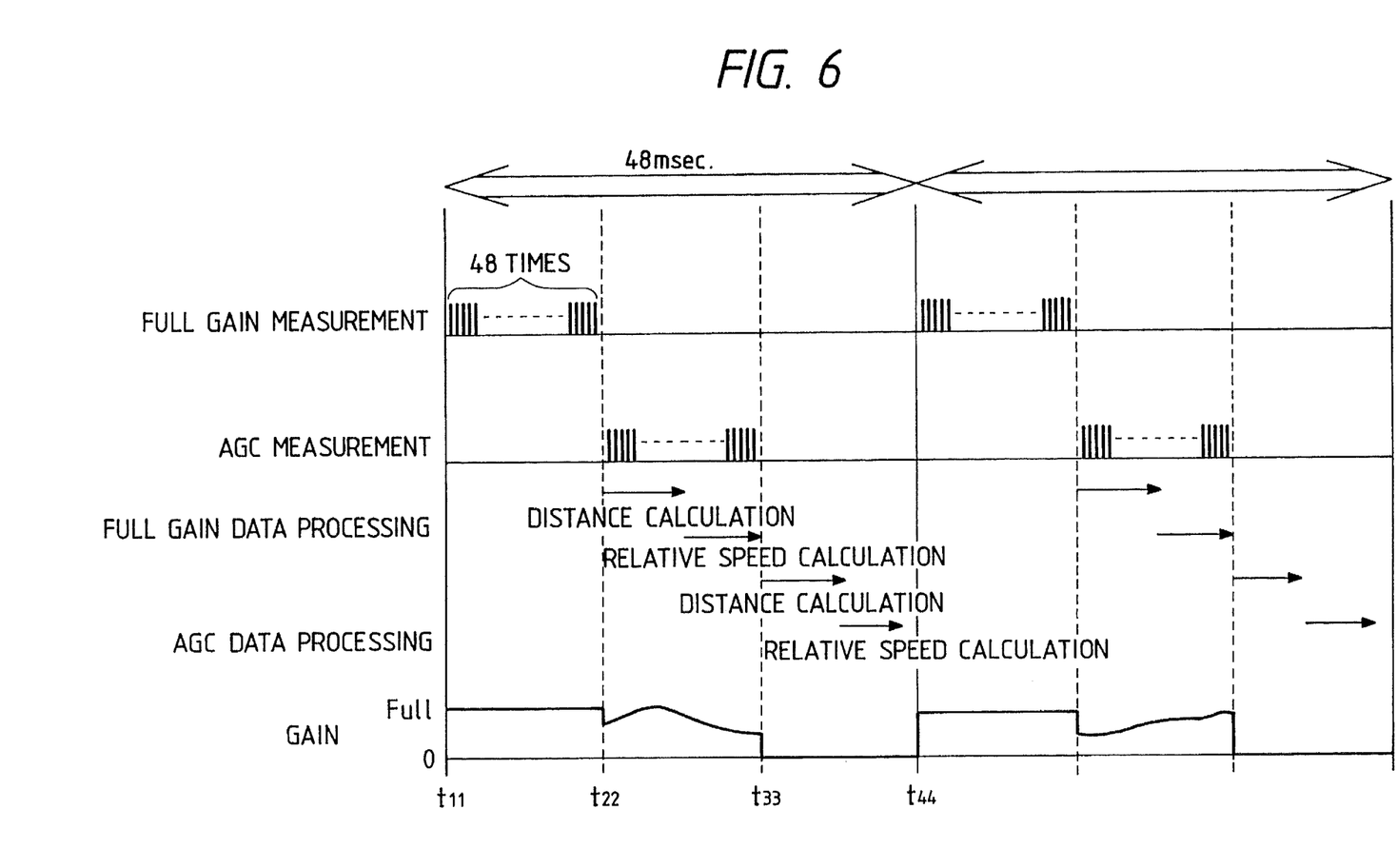
FIG. 6 is a time chart illustrating the procedure of the obstacle detecting process of the first embodiment of the present invention.

As illustrated in FIG. 6, the obstacle detecting process of the present embodiment repeats the similar processing at the intervals of 48 msec. This 48 msec period is divided into three 16 msec sections. A first 16 msec section (a time interval of t11–t22) executes the full gain measurement; namely, the laser diode 3 is repeatedly actuated with the gain of the variable gain amplifier 13 fixed at the maximum value (Full). For example, as shown in the drawing, 48 times measurements are intermittently and successively executed during this first 16 msec section. A distance data obtained in each measurement is memorized in the RAM.

In the second 16 msec section (a time interval t22–t33), the AGC measurement is executed by flexibly varying the gain of the variable gain amplifier 13. Meanwhile, in this second 16 msec section (t22–t33), both the full gain distance calculation processing and the full gain relative speed calculation processing are carried out on the basis of the distance data memorized during the first 16 msec section (t11–t22). Furthermore, in the third 16 msec section (t33–t44), both the AGC distance calculation processing and the AGC relative speed calculation processing are carried out on the basis of the distance data memorized during the second 16 msec section (t22–t33). Furthermore, the previously described anti-collision processing is carried out in this third 16 msec section.

Figure 7A:
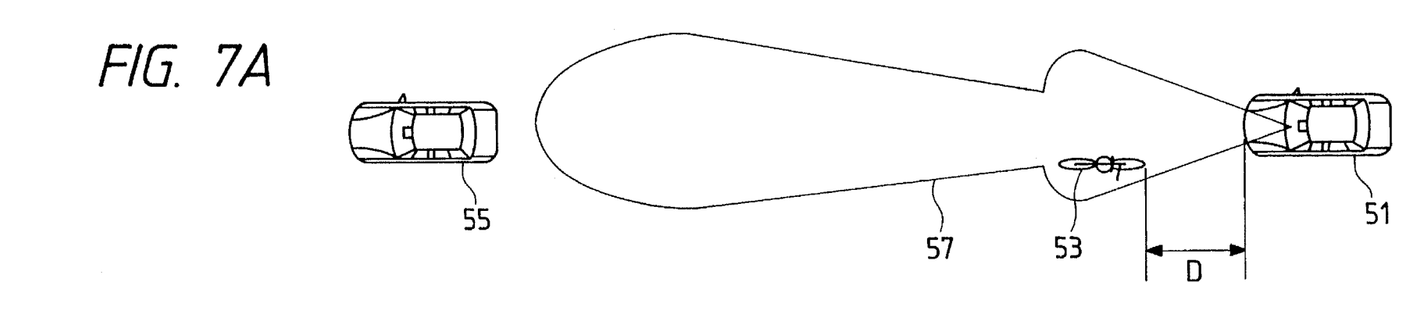
FIGS. 7A and 7b are views showing the relationship between an automotive vehicle equipped with the radar system in accordance with the first embodiment of the present invention.
Figure 7B:
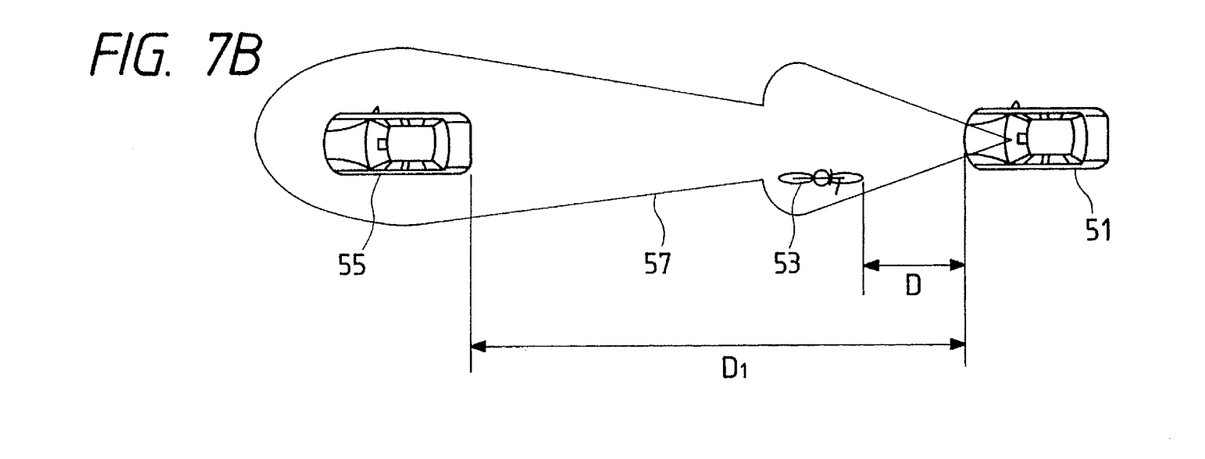

The effect of the present invention actually employed in an automotive vehicle will be next explained with reference to FIGS. 7A–10B; and FIG. 7A is a plan view illustrating a condition where an automotive vehicle 51 equipped with the radar system 1 is following a preceding motorcycle 53 traveling with a constant distance D kept therebetween, while the automotive vehicle 51 is gradually approaching a preceding automotive vehicle 55. FIG. 7B is a similar plan view showing a predetermined time later condition of these automotive vehicle 51, the motorcycle 53 and the automotive vehicle 55.

The FIG. 7A condition shows the motorcycle 53 captured in the detection area 57 of the radar system 1, although the preceding automotive vehicle 55 is out of the detection area 57. The predetermined time later condition FIG. 7B shows the automotive vehicle 55 and the motorcycle 53 both captured in the detection area 57 of the radar system 1.

Figure 8A:
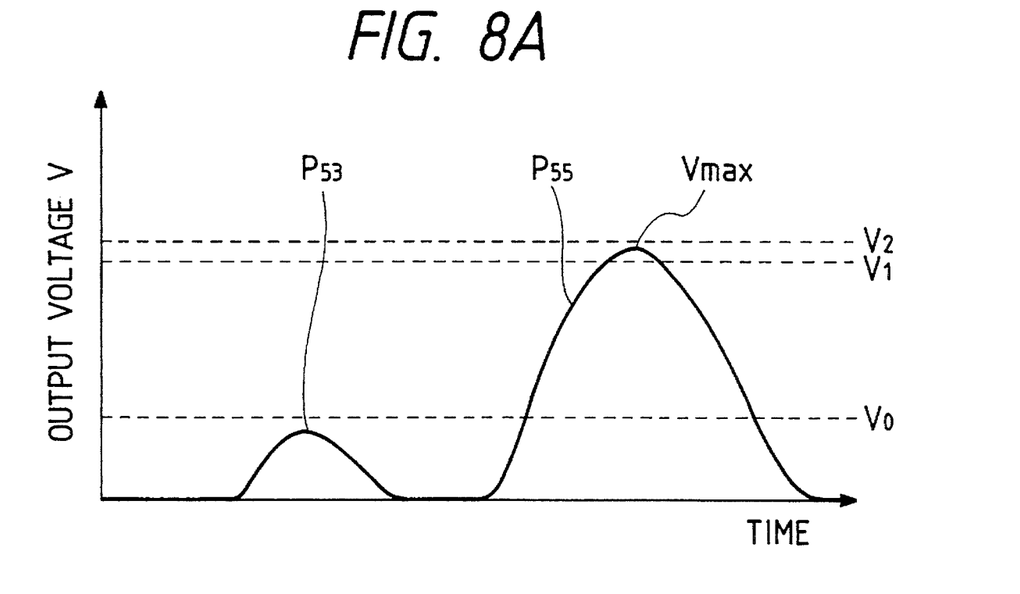
FIGS. 8A and 8B are time charts respectively showing an output voltage of the variable gain amplifier in accordance with the first embodiment of the present invention.
Figure 8B:
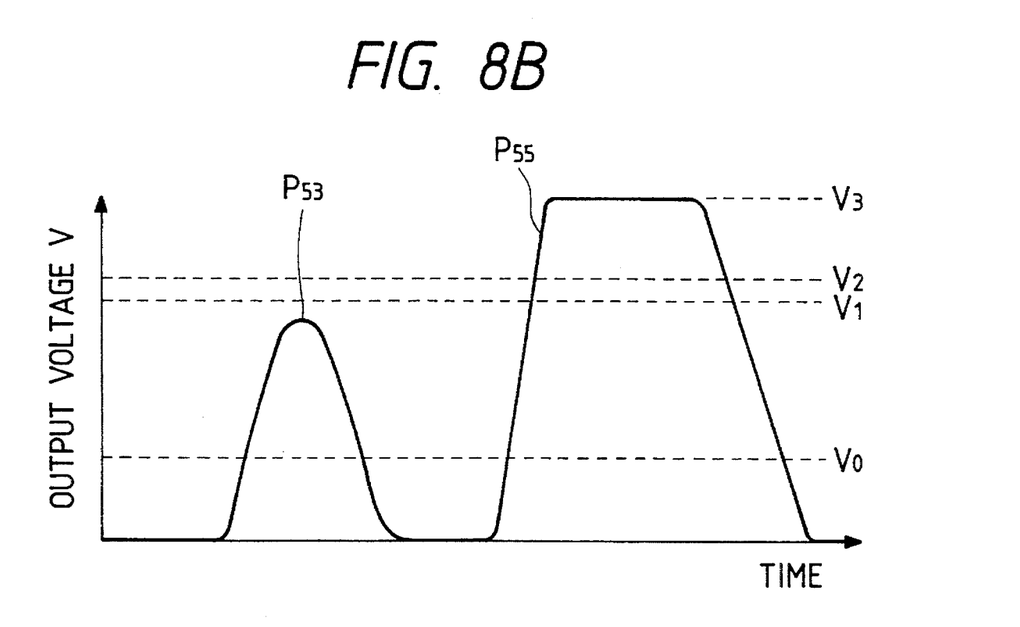

FIGS. 8A and 8B are time charts showing the output voltage V of the variable gain amplifier 13 in the condition of FIG. 7B. FIG. 8A shows the output voltage V obtained as a result of the AGC method flexibly controlling the gain of the variable gain amplifier 13. A semiconductor laser beam H reflected from the automotive vehicle 55 is stronger in its intensity than a semiconductor laser beam H reflected from the motorcycle 53. A small peak P53 represents an output voltage corresponding to the semiconductor laser beam H reflected from the motorcycle 53. Meanwhile, a large peak P55 represents an output voltage corresponding to the semiconductor laser beam H reflected from the automotive vehicle 55. The AGC is a technology amplifying the maximum voltage value Vmax to be somewhere between the predetermined higher voltages V1 and V2. Therefore, if the ratio of the peak P55 to the peak P53 is larger than the ratio of the voltage V2 to V0, the output voltage V of the small peak P53 is always below the reference voltage V0. For this reason, the AGC-based control of the variable gain amplifier 13 possibly fails to detect the motorcycle 53 in tile above particular situation.

Figure 9A:
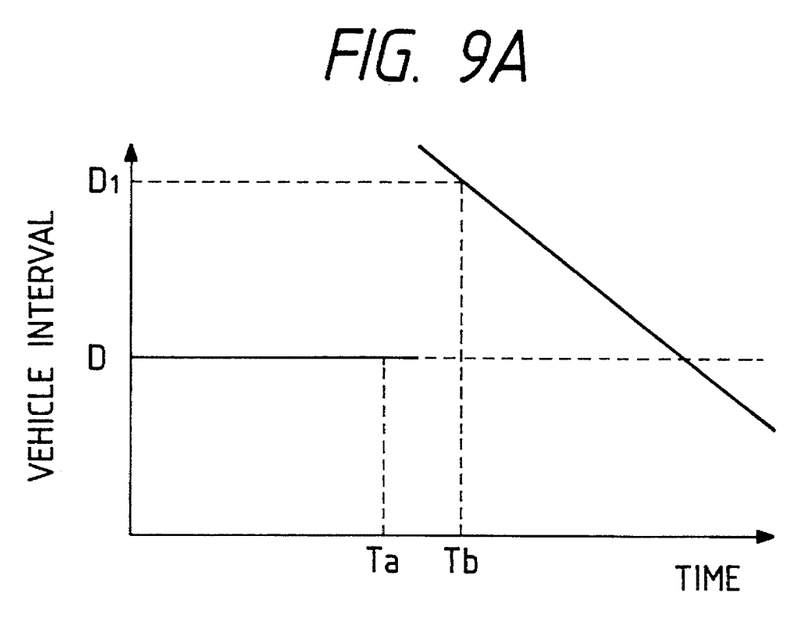
FIGS. 9A and 9B are time charts illustrating detection of the distances of preceding vehicles from the radar.

More specifically, as illustrated in FIG. 9A, the radar system 1 detects the preceding motorcycle 53 spaced a distance D from the automotive vehicle 51 at the time (Ta) the automotive vehicle 55 is out of the detection area 57. However, the radar system 1 fails to detect the preceding motorcycle 53 spaced a distance D from the automotive vehicle 51 at the time (Tb) the automotive vehicle 55 is captured in the detection area 57, although detecting only the automotive vehicle 55 spaced a distance D1 from the automotive vehicle 51.

FIG. 8B is a time chart showing the output voltage V obtained when the gain of the variable gain amplifier 13 is fixed to the maximum value (full gain). As apparent from the drawing, such a full gain measuring enables the small peak P53 to always exceed the reference voltage V0. Therefore, it becomes possible to reliably detect the existence of the motorcycle 53. The large peak P55 reaches the saturated voltage V3 of the variable gain amplifier 13, having a flat top in its waveform. In this manner, controlling the gain of the variable gain amplifier 13 to the full gain assures the detection of both the motorcycle 53 and the automotive vehicle 55.

Figure 9B:
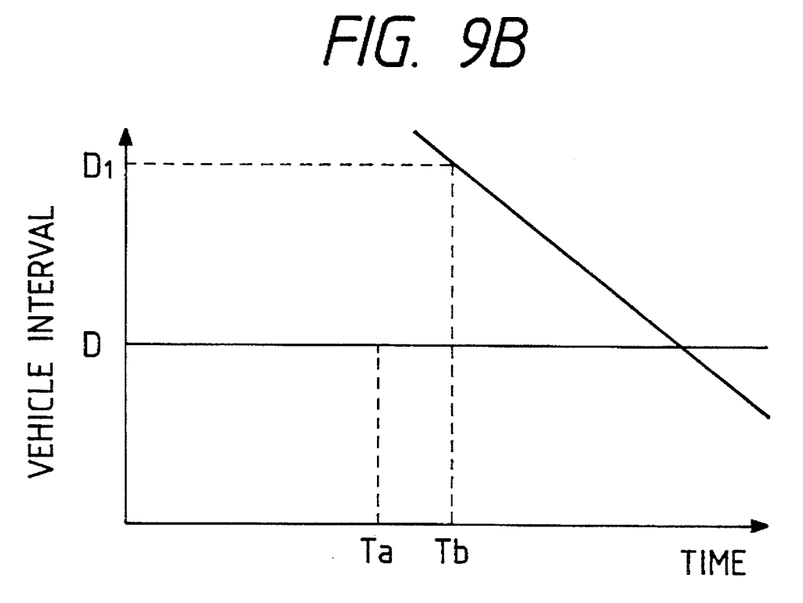

As illustrated in FIG. 9B, at the time Tb, the automotive vehicle 55 enters the detection area 57 of the radar system 1, both the distance D of the motorcycle 53 and the distance D1 of the automotive vehicle 55 are detected. However, the full gain distance and the full gain relative speed obtained in this manner include large measuring errors compared with the previously described AGC distance and the AGC relative speed.

The radar system 1 of the present embodiment executes the AGC based detection and the full-gain based detection alternately. Thus, the radar system 1 of the present embodiment not only reliably detects the presence of both the motorcycle 53 and the automotive vehicle 55 using the full-gain based detecting method but also accurately detects the true distance and the relative speed of the automotive vehicle 55 having a large reflectance using the AGC based detecting method.

Figure 10A:
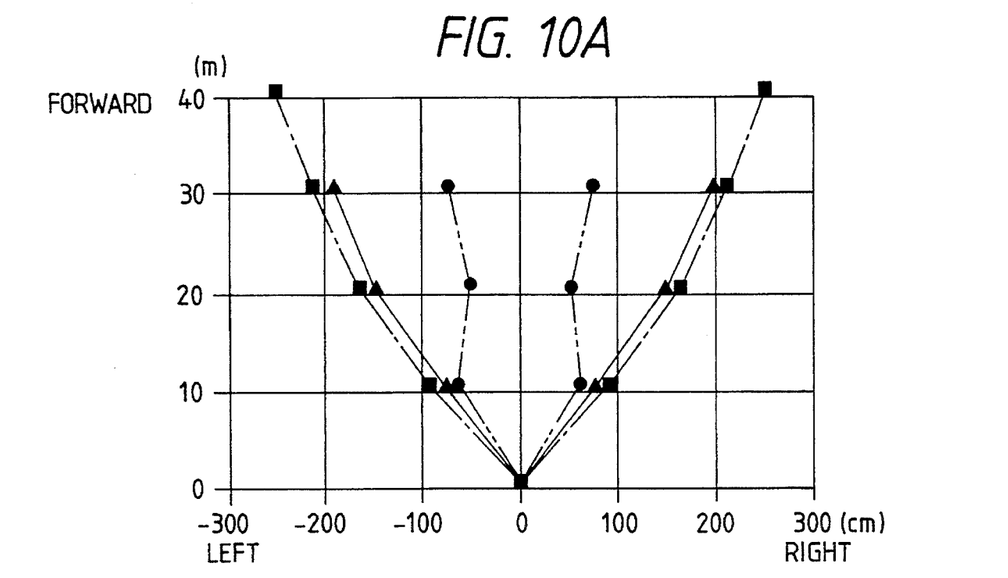
FIGS. 10A and 10B are graphs showing limitations of the detecting capability of the radar system in accordance with the first embodiment of the present invention.
Figure 10B:
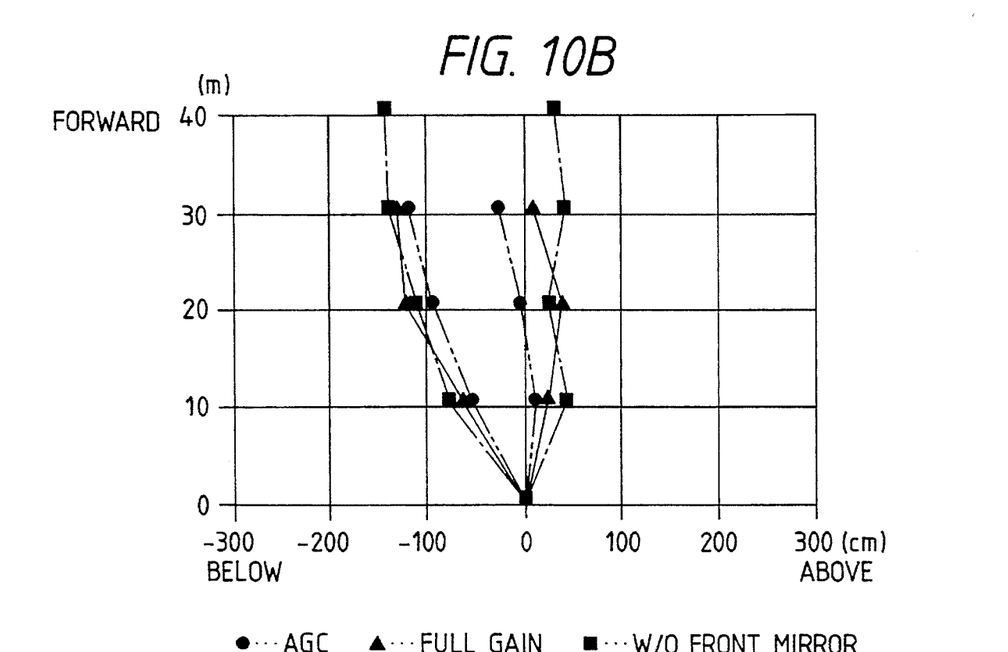

FIGS. 10A and 10B show limitations capable of detecting another same reflective mirror under the condition that a circular reflective mirror of 51 mm is placed at a 40 m ahead position of the radar system 1. An abscissa of FIG. 10A represents distances in the right and left direction, while an abscissa of FIG. 10B represents distances in the up-and-down direction. As shown by an alternate long and two short dashes line in FIG. 10A, the AGC based detection has narrow limitations compared with the limitations of an alternate long and dash line. The alternate long and dash line corresponds to a case where no reflective mirror is placed in front of the radar system 1. (In this case, the similar result is obtained irrespective of the difference between the AGC based detection and the full gain based detection.) On the other hand, as shown by a solid line if FIG. 10A, the full gain based detection has substantially the same limitations as those of the alternate long and dash line. Therefore, it is understood that the AGC based detection possibly fails to detect an object out of its centrally narrowed limitations in the right and left direction, while the full gain based detection provides sufficiently wide detecting limitations. Regarding the limitations in the up-and-down direction shown in FIGS. 10B, there was not found substantial difference among three detections above described.

In this manner, as the radar system 1 executes the AGC based detection and the full-gain based detection alternately, a wide detection area can be assured so that the radar system 1 can detect a plurality of mirrors dispersed in a wide area. Thus, the radar system 1 of the present embodiment can detect each of obstacles properly even if a plurality of obstacles exist in the same detection area 57.

Although the electronic control circuit 9 of the above-described embodiment executes the anti-collision processing on the basis of distance data calculated, various processing can be executed additionally. For example, keeping a constant-distance between the preceding vehicle and the radar system will be acceptable. Furthermore, the radar system 1 of the present invention can be applied to various apparatuses other than automotive vehicles.

Moreover, the radar system 1 of the present invention is not limited to the above-described embodiment. For example, the output voltage V of the variable gain amplifier 13 can be A/D converted and then directly supplied to the electronic control circuit 9, so that the electronic control circuit 9 can execute various processing in response to the output voltage V. Still further, two variable gain amplifiers 13, 13 can be provided so that the AGC based detection and the full gain based detection can be simultaneously and independently carried out, assuring speediness and accuracy in the detection. Although the above-described embodiment utilizes the semiconductor laser beam H to detect an obstacle, it is needless to say that other electromagnetic wave such as microwave and infrared ray can be used.

Although the above-described embodiment controls the gain of the variable gain amplifier 13 to take its maximum value to maximize the sensitivity of the semiconductor laser H, it is possible to vary the reference voltage V0 of the comparator 17 so that the reference voltage V0 is lowered sufficiently enough to detect the obstacle. Furthermore, by varying the reference voltage V0 in accordance with Vmax, it becomes possible to reduce the measuring error of distance as well as AGC.

As explained in the foregoing description, the radar system of the present invention allows the electromagnetic wave reception means to use both a standard sensitivity corresponding to the maximum value of the electromagnetic wave received and a maximum sensitivity of the electromagnetic wave reception means. Accordingly, the present invention not only surely detects the presence of all the obstacles in the detection area using the maximum sensitivity but also accurately detects the true distance of the obstacle reflecting the largest electromagnetic wave using the standard sensitivity.

As this invention may be embodied in several forms without departing from the spirit of essential characteristics thereof, the present embodiment as described is therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A radar system comprising:

electromagnetic wave transmission means for intermittently emitting an electromagnetic wave of a pulse waveform;

electromagnetic wave reception means for receiving said electromagnetic wave reflected from an obstacle;

distance calculating means for calculating a distance of said obstacle from said radar system based on a time interval between said transmission of said electromagnetic wave from said electromagnetic wave transmission means and said reception said electromagnetic wave by said electromagnetic wave reception means;

first reception control means for controlling a gain of said electromagnetic wave reception means to have a standard sensitivity corresponding to a maximum value of said electromagnetic wave received by said electromagnetic wave reception means; and second reception control means for controlling said gain of said electromagnetic wave reception means to have its maximum sensitivity, wherein said time interval is calculated based on said electromagnetic wave detected by said electromagnetic wave reception means having said standard sensitivity and said electromagnetic wave detected by said electromagnetic wave reception means having said maximum sensitivity.

2. A radar system in accordance with claim 1, wherein said first reception control means controls said gain of said electromagnetic wave reception means using an automatic gain control method.

3. A radar system in accordance with claim 1, wherein said first reception control means and said second reception control means alternately measure said distance of said obstacle.

4. A radar system in accordance with claim 1, further comprises comparing means for comparing a first distance of said obstacle measured based on said standard sensitivity and a second distance of said obstacle measured based on said maximum sensitivity to determine a true distance of said obstacle.

5. A radar system in accordance with claim 4, wherein said first distance obtained based on said standard sensitivity is adopted as said true distance when a difference between said first distance and said second distance is not larger than a predetermined value, while said second distance obtained based on said maximum sensitivity is adopted as said true distance when said difference between said first distance and said second distance is larger than said predetermined value.

6. A radar system in accordance with claim 5, further comprising anti-collision control means for generating an alarm when said true distance is shorter than a predetermined safe distance.

7. A radar system in accordance with claim 1, further comprising measuring period varying means for varying a period of emitting said electromagnetic wave from said electromagnetic wave transmission means so that one complete measuring cycle is varied in response to accuracy required.

8. A radar system in accordance with claim 7, wherein said accuracy is judged based on said distance of said obstacle obtained.

9. A radar system for measuring a distance of an obstacle, comprising:

a semiconductor laser diode emitting a semiconductor laser beam of pulse waveform;

a light receiving element receiving said semiconductor laser beam reflected from said obstacle and generating a voltage signal corresponding to an intensity of said semiconductor laser beam received;

a drive circuit actuating said semiconductor laser diode;

a control circuit connected to said drive circuit for supplying said drive circuit with a drive signal to emit said semiconductor laser beam from said semiconductor laser diode;

a variable gain amplifier receiving said voltage signal generated from said light receiving element and amplifying said voltage signal in response to a gain given by said control circuit;

a comparator comparing an output of said variable gain amplifier with a reference value and generating a light receiving signal when an output of said variable gain amplifier exceeds said reference value; and a time interval measuring circuit receiving both said drive signal and said light receiving signal to measure a time interval between transmission of said drive signal and reception of said light receiving signal and sending said time interval as distance data to said control circuit, said control circuit calculating distance of the obstacle from said radar system based on said distance data, and wherein said control circuit controls a gain of said variable gain amplifier to have a standard sensitivity corresponding to a maximum value of said semiconductor laser beam receiving by said light receiving element during a first measuring period, and controls said gain of said variable gain amplifier to have its maximum sensitivity during a second measuring period.

10. A radar system in accordance with claim 9, wherein said output of said variable gain amplifier is input to a window comparator which compares said output of said variable gain amplifier with each of two predetermined window values to produce a comparison result.

11. A radar system in accordance with claim 10, wherein said comparison result of said window comparator is sent to said control circuit to execute an automatic gain control of said variable gain amplifier.

12. A radar system in accordance with claim 9, wherein said control circuit is connected to a warning device that generates an alarm when said distance of said obstacle is shorter than a predetermined safe distance.

13. An obstacle detecting method for a radar system having beamed energy transmission means for emitting a beam and beamed energy reception means for receiving said beam reflected from an obstacle, said radar system operating in measuring cycles, each measuring cycle comprising:

a first controlling step of controlling a gain of said beamed energy reception means to have its maximum sensitivity;

a first calculating step of calculating a first distance of said obstacle from said radar system based on a time interval between transmission of said beam from said beamed energy transmission means and reception of a reflected beam by said beamed energy reception means having said maximum sensitivity;

a second controlling step of controlling said gain of said beamed energy reception means to have a standard sensitivity corresponding to a maximum value of said beam received by said beamed energy reception means; and a second calculating step of calculating a second distance of said obstacle from the radar system based on a time interval between transmission of said beam from said beamed energy transmission means and reception of a reflected beam by said beamed energy reception means having said stand sensitivity.

14. An obstacle detecting method in accordance with claim 13, wherein said measuring cycle is divided into at least a first, a second and a third sequential section, wherein said first controlling step is executed in said first section, said first calculating step and said second controlling step are executed in said second section, and said second calculating step is executed in said third section.

15. An obstacle detecting method in accordance with claim 13, further comprising a comparing step of comparing said first and said second distances of said obstacle obtained from said first and said second calculating steps in order to determine a true distance.

16. An obstacle detecting method in accordance with claim 15, wherein said first distance obtained in said first calculating step is adopted as said true distance when a difference between said first and said second distances is larger than a predetermined value, and said second distance obtained in said second calculating step is adopted as said true distance when said difference between said first and said second distances is not larger than said predetermined value.

17. An obstacle detecting method in accordance with claim 16, further comprising an anti-collision processing executed based on said true distance, said anti-collision processing generating an alarm when said true distance is shorter than a predetermined safe distance.

18. An obstacle detecting method in accordance with claim 13, further comprises a measuring period varying step of varying a period of said measuring cycle in response to accuracy required.

19. An obstacle detecting method in accordance with claim 18, wherein said accuracy is judged based on said distances of said obstacle obtained in said first and said second calculating steps.

20. An obstacle detecting method in accordance with claim 13, wherein said second controlling step is carried out by automatic gain control which flexibly adjusts said gain of said beamed energy reception means in such a manner that said maximum value of said beam received by said beamed energy reception means is in a predetermined range.

* * * * *

UNITED STATES PATENT AND TRADEMARK OFFICE
CERTIFICATE OF CORRECTION

PATENT NO. : 5,485,155
DATED : January 16, 1996
INVENTOR(S) : Hibino

It is certified that error appears in the above-identified patent and that said Letters Patent is hereby corrected as shown below:

On the title page: Item [73]

Assignee:  Nippondenso Co., Ltd, Toyota, Japan It should read:

Assignee:  Nippondenso Co., Ltd, Kariya, Japan
                Toyota Jidosha Kabushiki Kaisha,
                Toyota, Japan Signed and Sealed this Ninth Day of July, 1996

*Attest:*

BRUCE LEHMAN

*Attesting Officer*    *Commissioner of Patents and Trademarks*